(12) United States Patent
Lo et al.

(10) Patent No.: US 7,831,999 B2
(45) Date of Patent: Nov. 9, 2010

(54) SYSTEM AND METHOD FOR SINGLE SECURITY ADMINISTRATION

(75) Inventors: Hong-Hsi Lo, East Brunswick, NJ (US); Rich Lee, Morristown, NJ (US)

(73) Assignee: BEA Systems, Inc., Redwood Shores, CA (US)

( * ) Notice: Subject to any disclaimer, the term of this patent is extended or adjusted under 35 U.S.C. 154(b) by 1095 days.

(21) Appl. No.: 10/731,371

(22) Filed: Dec. 9, 2003

(65) Prior Publication Data

US 2004/0158737 A1 Aug. 12, 2004

Related U.S. Application Data

(60) Provisional application No. 60/432,125, filed on Dec. 9, 2002.

(51) Int. Cl.
  G06F 7/04 (2006.01)
  G06F 15/16 (2006.01)
  G06F 17/30 (2006.01)
  G04L 29/06 (2006.01)
(52) U.S. Cl. .......................................... 726/4
(58) Field of Classification Search .................. 726/4; 72/4
  See application file for complete search history.

(56) References Cited

U.S. PATENT DOCUMENTS 6,141,686 A 10/2000 Jackowski et al.
2002/0029200 A1 3/2002 Dulin et al.
2003/0005297 A1* 1/2003 Fichtner et al. ............. 713/168
2003/0033535 A1* 2/2003 Fisher et al. ................ 713/185

OTHER PUBLICATIONS

TheServerSide.com, "BEA announces Bea Tuxedo 8.0 and Bea Weblogic 6.0", published on Jun. 12, 2001.*
Zois.co.uk, "Using Tuxedo Asynchronously with Global Transactions", Technical note Apr. 23, 2001.*
"Overview of the COBRA Security Features" 2001, e-docs.bea.com/tuxedo/tux80/security/overview.htm, BEA Systems Inc., see p. 2-7.
"The WebLogic Enterprise Security Features", 2000, edocs.bea.com/wle/security/concepts.htm, BEA Systems Inc., see pp. 2, 6, 8, 9, 21.

* cited by examiner

*Primary Examiner*—Christian LaForgia
*Assistant Examiner*—Harris C Wang
(74) *Attorney, Agent, or Firm*—Fliesler Meyer LLP

(57) ABSTRACT

A method for providing single security administration comprising the steps of: allowing a client (e.g. a Tuxedo client) to access a default security plugin; issuing a call (e.g. tpinit) to an LDAP authentication server at a first (e.g. Tuxedo) server; passing query user information from the LDAP authentication server to an embedded LDAP server at a second (e.g. WLS) server; returning corresponding user information to the LDAP authentication server; and, providing an authentication token for use by the client.

23 Claims, 2 Drawing Sheets

SYSTEM AND METHOD FOR SINGLE SECURITY ADMINISTRATION

CLAIM OF PRIORITY

This application claims the benefit of U.S. Provisional Application "SYSTEM AND METHOD FOR SINGLE SECURITY ADMINISTRATION", Serial No. 60/432,125; filed Dec. 9, 2002, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to application servers and other enterprise servers, and particularly to a system and method for administering security in complex or distributed server environments.

BACKGROUND

In the application server marketplace, an enterprise-level customer will often utilize two or more different types of server product, some of which may be a newer version of a particular application server product, while others may be older versions, or even legacy systems. Many of these customers need the ability to implement an enterprise security framework that encompasses all of the application servers. For example, a customer who uses both Tuxedo and WebLogic Server (WLS) might want to simplify their system administration work at the security level so that they can manage enterprise security from a central point. Today these customers will have two sets of security to manage—one set for their Tuxedo product, and the other set for their WLS product. If a particular user needs to access services in both the Tuxedo and the WLS environments then the system administrator will have to add or modify the same user information to both Tuxedo and WLS for that particular user. This repetition of administrative work is both cumbersome and error-prone. To date, there is no feature that provides the administrator with a centralized means for managing security that spans both (for example the Tuxedo and WebLogic) environments.

SUMMARY

The present invention solves the problem of managing security over different computing environments by consolidating all user related information at a central point, for example within an application server. With traditional security architectures, an enterprise system administrator who had both application servers (for example WebLogic Server, WLS) and other enterprise systems (for example Tuxedo) deployed within their environment, would usually have to manage two sets of security information, in this instance one for WebLogic Server and the other one for Tuxedo. The present invention leverages the application server's security to help the system administrator managing their security database, by eliminating user and group information from the enterprise system. System-specific information, such as Access Control List information can still reside in the Tuxedo product.

In accordance with one embodiment, a method is provided for providing single security administration comprising the steps of: allowing a client (for example a Tuxedo client) to access a default security plugin; issuing a call (tpinit) to an Lightweight Directory Access Protocol (LDAP) authentication server at a first (e.g. Tuxedo) server; passing query user information from the LDAP authentication server to an embedded LDAP server at a second (e.g. WLS) server; returning corresponding user information to the LDAP authentication server; and, providing an authentication token for use by the client.

DETAILED DESCRIPTION

Figure 1:
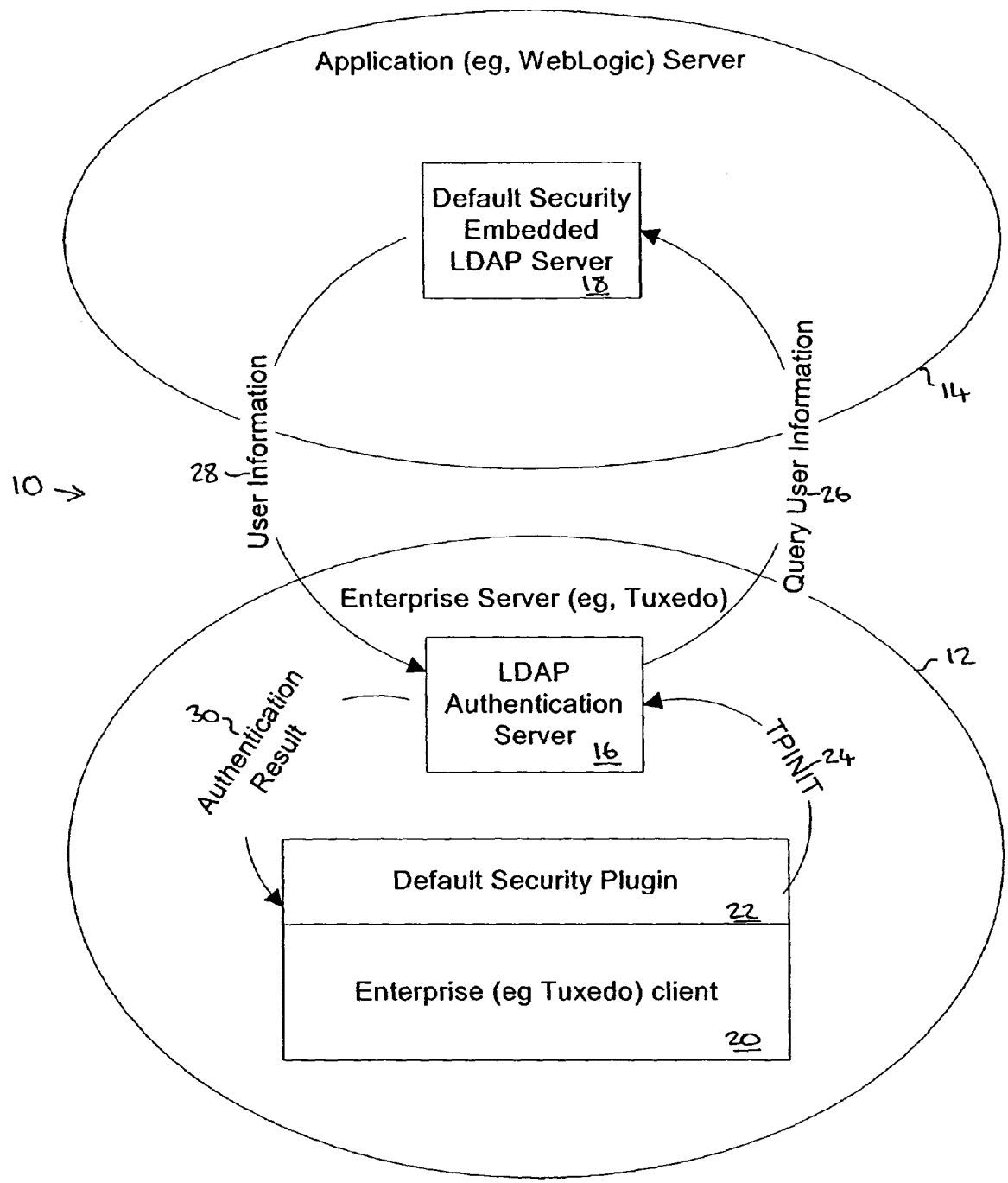
FIG. 1 illustrates a schematic of a single security system in accordance with an embodiment of the invention.

The present invention solves the problem of managing security over different computing environments by consolidating all user related information at a central point, for example within an application server. With traditional security architectures, an enterprise system administrator who had both application servers (for example the WebLogic Server product from BEA Systems, Inc., referred to herein as WLS), and other enterprise systems (for example the Tuxedo product, also from BEA Systems, Inc.), deployed within their environment, would usually have to manage two sets of security information, in this instance one for WebLogic Server and the other one for Tuxedo. The present invention leverages the application server's security to help the system administrator managing their security database, by eliminating user and group information from the enterprise system. System-specific information, such as Access Control List information can still reside in the Tuxedo product.

More particularly, in an environment that includes either multiple application servers, or an application server and a legacy-type system, the present invention provides the system administrator with a means to manage their security database from a central point. In accordance with one embodiment, the application server's security features are leveraged to provide user authentication throughout the enterprise, which allows user and group information to be eliminated from the enterprise system. This new feature leverages OPEN Lightweight Directory Access Protocol (LDAP) to make a single user security data store and administration possible. The use of a single data store assists the system administrator by only requiring them to maintain user security information at a single location, for example at a WebLogic Server embedded LDAP server. The single security administration also means the system administrator can administer the security information from a single system, e.g. from within the WebLogic Server Console program.

In accordance with one embodiment, the system can be used to consolidate all user related information in WebLogic Server (WLS). Without this feature the system administrator of a Tuxedo/WLS environment would have to administer the user information separately in both Tuxedo and WLS. The administrator should be aware that the Tuxedo-specific tpgrp, and tpacl file information should still be maintained in Tuxedo if the Tuxedo ACL or MANDATORY_ACL is desired.

Definitions of Terms, Acronyms, and Abbreviations

AAA: Authentication, Authorization, and Auditing.

ACL: Access control list—The authorization scheme used by Tuxedo.

LDAP: Lightweight Directory Access Protocol—A standard way of managing directory information.

MP: The MP specifies a multi-machine configuration for a Tuxedo application.

PIF: Plug-In Framework—A Tuxedo infrastructure component that allows customization of BEA Tuxedo infrastructure capabilities through the use of plug-in module.

Schema: The Schema is used to define the structure of LDAP database. Every LDAP server must use a particular schema, which defines what attributes can be stored in what type of object.

SDS: System Data Store—The LDAP used internally by WLS default security service.

UBBCONFIG: The Tuxedo System/T ASCII configuration file.

DN: Distinguished Name.

FIG. 1 shows an illustration of a single security system 10 in accordance with an embodiment of the invention. In the past, the Tuxedo user security file would have to be copied from Tuxedo to each WLS server for use by that server in authenticating users. However, using the invention a Tuxedo customer can access the WLS security. As shown in FIG. 1, a first enterprise or application server 12 (e.g. a Tuxedo server) communicates with a second enterprise or application server 14 (e.g. a WLS server). The first (Tuxedo) server provides an LDAP authentication server 16. In this embodiment the LDAP authentication server replaces the regular Tuxedo authentication server, but from the perspective of a Tuxedo user operates much the same in that it continues to understand Tuxedo tpinit calls, etc. The second (WLS) server 14 includes an embedded LDAP server plugin 18 to allow the Tuxedo user to use WLS security. When, for example, a Tuxedo client 20 makes a tpinit call, the Tuxedo library directs this call to the default security plugin 22, which in turn forwards it 24 to the LDAP authentication server 16. The LDAP authentication server 16 checks a user profile database (or user profile configuration information) to determine where the particular user security information is stored. An LDAP session is then initiated between the first (Tuxedo) server 12 and the second/determined (WLS) server 14. A query user information 26 is passed from the LDAP authentication server 16 to the embedded LDAP server 18 at the WLS, specifying a particular user. The corresponding user information 28 is then returned to the LDAP authentication server 16. Upon receipt of the user information a token 30 is then created that reflects this authentication result, and which can be used by the Tuxedo client.

The Tuxedo system shown in FIG. 1 does not need to be drastically changed in order to provide the distributed authentication—the LDAP authentication server is just configured so that it understands a standard Tuxedo tpinit call. From the clients' perspective the authentication process is the same as before (i.e. without single security implemented).

It should be noted that although a Tuxedo server and a WLS server is shown in FIG. 1, the present system and methods can be implemented to work with other application servers and enterprise servers that support LDAP, or that support the use of an embedded LDAP authentication server. Furthermore, a cluster or plurality of servers can be used to implement single security administration, and to provide backup or failover authentication should one of the servers, or the communications link to one of the servers, fail. The failover server needs to be able to provide the LDAP authentication service.

In addition, in some embodiments a user information cache may be provided in order to temporarily cache a copy of the user authentication information in case of a failure in the communications link between the two servers. Whenever necessary, the cache can be flushed to effectuate immediate changes to the security information.

The system may also be fully scalable so that multiple authentication servers can be used, as can multiple embedded LDAP servers.

Figure 2:
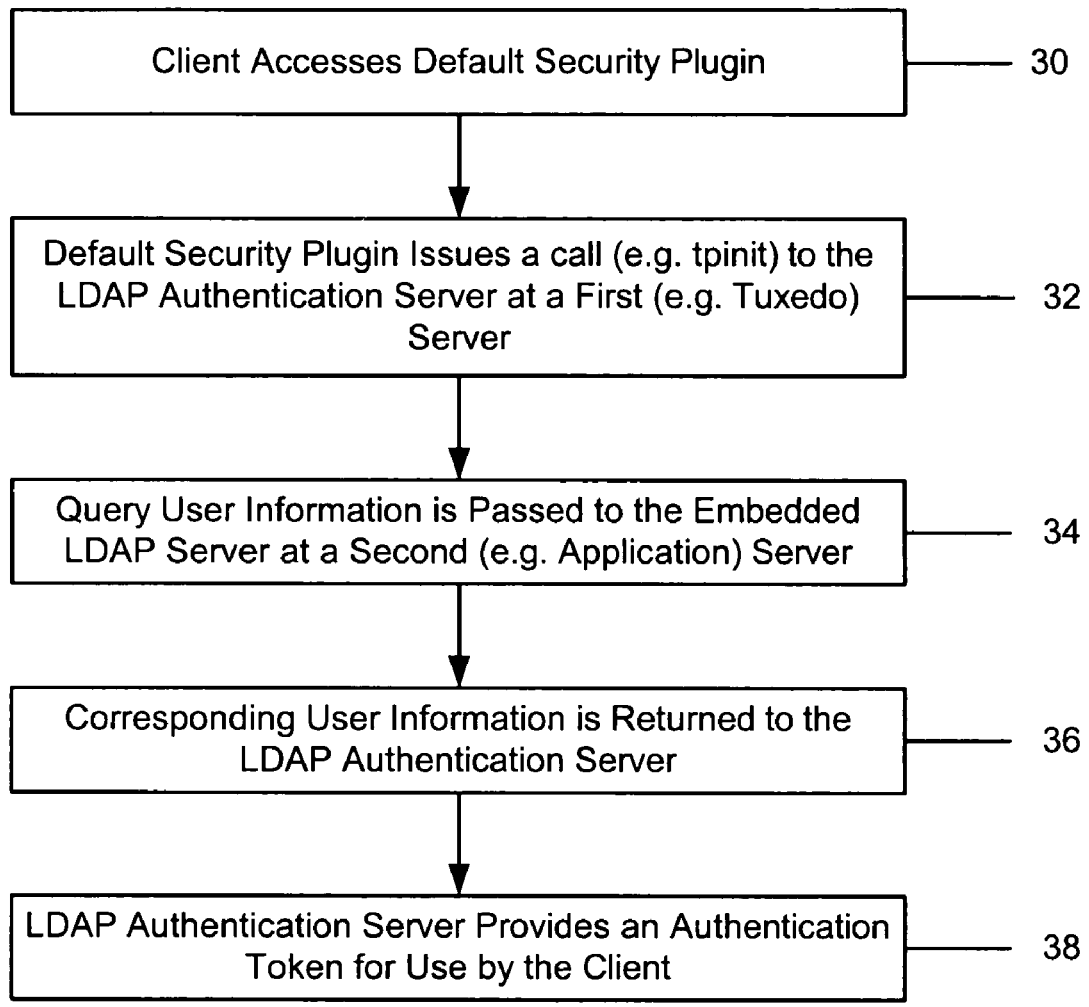
FIG. 2 illustrates a flowchart of a method for providing single security administration in accordance with an embodiment of the invention.

FIG. 2 illustrates a flowchart of a method in accordance with an embodiment of the invention. As shown therein, in step 30, the client (in this instance a Tuxedo client) accesses the default security plugin. In step 32, the default security plugin issues a call (such as a tpinit call) to the LDAP authentication server. In step 34, the query user information is passed to the embedded LDAP server at the application server (for example the WebLogic Server). In step 36, corresponding user information is then returned to the LDAP authentication server. In step 38, the authentication server provides an authentication token for use by the client.

Migration Tool

In addition to providing real-time authentication of users between different application server types, another application of the present system is that it can be used to perform migration of users from one system to another. For example, Tuxedo user information (from the Tuxedo tpusr and tpgrp files) can be migrated to WebLogic Server. During migration, a migrating utility, tpmigldap, takes input from the tpusr and tpgrp files and updates the corresponding WebLogic server security database.

Tuxedo/WLS Implementation

In the context of a Tuxedo/WebLogic server environment, an embodiment of the present invention allows Tuxedo to use WLS as the security database to authenticate Tuxedo users. In accordance with this embodiment, the single security database resides in WebLogic Server. It is required to modify the Tuxedo UBB configuration file to enable this new feature. At the same time Tuxedo can continue to support the old Tuxedo security authentication styles, such as NONE, APP_PW, USER_AUTH, ACL, and MANDATORY_ACL. For customers with both Tuxedo and WebLogic Server, but who do not need to do tight integrating, they can continue configuring and operating Tuxedo as they had done before, i.e. have separate security database and separate security administration. However, the feature is especially useful for those customers who prefer to not maintain separate user databases.

The following is the list of the functions provided by this feature:

Single User Security Database

Single User Security Administration

User Characteristics and Impact

There is no visible impact to the Tuxedo user or to the server/client programming interface, since all of the changes to provide single security are "under the cover". The default Tuxedo security type is "NONE" in the RESOURCES section of the UBBCONFIG. file just as before. It can continue supporting other types of Tuxedo security, such as APP_PW, USER_AUTH, ACL, and MANDATORY_ACL. The difference "under the cover" is that user authentication will actually retrieve user information from WLS instead of reading it from the tpusr file.

Single User Security Database

In the current implementation, Tuxedo stores its security configuration information in three files. The tpusr file contains the Tuxedo user information including the password. The tpgrp file contains the Tuxedo group information. The tpacl file contains the Tuxedo Access Control List information. The enhanced functionality provided by the present invention allows Tuxedo to access the user security information stored in the WLS embedded LDAP server. The security information stored in WebLogic Server contains information such as user identification, password, and which security groups the user is a member. If this feature is used then there is no more need for tpusr file. However, the tpacl, and tpgrp files are still required if Tuxedo security is configured to use either ACL or MANDATORY_ACL.

In one embodiment, for Tuxedo user information, the WLS LDAP database contains both the user name and password. The Tuxedo user name is mapped to the WLS System Data Store object class inetOrgPerson's "uid" that is the identity of login id. This is then set to the value entered for the user in the WLS Admin console. The user password is mapped to the "userpassword" in the inetOrgPerson class. The group which the user belongs to is mapped to the "wlsMemberOf" in the inetOrgPerson class.

For Tuxedo, group information is stored in the WLS groupOfURLs class. The name of the Tuxedo group is the common name (cn) attribute of the groupOfURLs. This group common name is set to the value entered for the group from the WLS Admin console. Table 1 describes these mappings.

TABLE 1

| Tuxedo Name | LDAP class | LDAP attribute |
|---|---|---|
| User name | InetOrgPerson | uid |
| User password | InetOrgPerson | userpassword |
| User group information | InetOrgPerson | wIsMemberOf |
| Group | GroupOfURLs | cn |

This function removes the need for the traditional Tuxedo user-security database file, tpusr. Instead, WebLogic Server's embedded LDAP stores all of the information required for Tuxedo user authentication. At runtime, a Tuxedo authentication server, LAUTHSVR, retrieves user information from the WebLogic Server's embedded LDAP and authenticates the user. If the authentication is successful then an appkey is returned to the user.

In Tuxedo, a Tuxedo user can only belong to one Tuxedo group. However, in WLS a user can be a member of several groups. To resolve this problem, in one embodiment, the authentication server will put a user in the first Tuxedo group it discovers. For example, suppose a user Sam belongs to GRP1, GRP2, and WLSGRP. Both GRP1, and GRP2 are defined in the tpgrp file, and thus are Tuxedo groups. WLSGRP is not defined in the tpgrp file, and it is not mapped to Administrators and Operators groups so it is not a Tuxedo group. When Sam logs into Tuxedo, the authentication server finds Sam belongs to GRP1 before it finds out Sam also belongs to GRP2; then Sam will be assigned the APPKEY with value of GRP1.

A valid Tuxedo group is a group defined in the tpgrp file plus the Administrators and Operators groups. By default Administrators maps to WLS "Administrators" group, and Operators maps to WLS "Operators" group. So by default a WLS Administrators user can also administrator Tuxedo, a WLS Operators user can operate Tuxedo. This default mapping can be modified through the configuration file. By changing the mapping a Tuxedo administrator may not be a WLS administrator, and vice versa.

Single Security Administration Console

In accordance with one embodiment, the single security system and methods can be used to allows the system administrator to administer the security database from within the WLS console for Tuxedo. This features uses the single data repository for user security information as described above. The administrator only needs to configure the user and user password once in WLS instead of configuring the user in both Tuxedo and WLS. This means the administrators can configure all of their Tuxedo and WLS users from a single WLS admin console. Since the single authorization is not required, this approach only stores user name and user password information in WLS LDAP. Tuxedo continues to hold the information of group and access control list. This is simpler since it only uses WLS to resolve user authentication.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic oroptical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the system described above are described in the context of WebLogic and Tuxedo servers, it will be evident that the system may be used with other types of applications, clients, application servers, and enterprise servers. It will also be evident that the system can be used to provide security for users and for user/client applications, and that the system may be extended to include a plurality of servers. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for single security administration comprising:
a first application server of a transactional server type, which is configured to execute transaction processes including receiving transactional procedure calls from clients to initiate the transaction processes, wherein the first application server includes
an access control list which defines user security information for use in authorizing the calls from clients, and a Lightweight Directory Access Protocol (LDAP) authentication server plugin which is configured to forward the transactional procedure calls from clients to another application server for authorization;

a second application server of a non-transactional server type, which is configured to administer security for the first application server, wherein the second application server includes a user profile database which includes security information for a plurality of users, including for each of the users a mapping of security credentials for that user between the transactional server type and the non-transactional server type, and an embedded LDAP server which is configured to receive and process the transactional procedure calls from the LDAP authentication server plugin; and wherein, when a transactional procedure call to initiate a transaction is received from a client at the first application server, the LDAP authentication server plugin identifies the user associated with the transactional procedure call, determines that the second application server should authenticate the user, initiates an LDAP session between the first application server and the second application server, determines a third application server of a non-transactional server type that stores user and group information for the user, when the second application server fails, initiates an LDAP session between the first application server and the third application server, and forwards the transactional procedure call to an embedded LDAP server in the third application server, wherein, upon receiving the transactional procedure call from the LDAP authentication server plugin, the embedded LDAP server processes the transactional procedure call, determines a corresponding user information from the user profile database, and returns the corresponding user information to the LDAP authentication server plugin, and wherein, after receiving from the embedded LDAP server a corresponding user information as determined by the user profile database at the second application server, the LDAP authentication server plugin creates a token reflecting an authentication result based on the corresponding user security information, which is subsequently used to authenticate the client to participate in the transaction.

2. The system of claim 1 wherein said first application server is an enterprise server.

3. The system of claim 1 wherein said transactional procedure call includes a query information that is query user information that specifies a particular user or group of users.

4. The system of claim 1 wherein the system includes a plurality of servers.

5. The system of claim 4 wherein at least two of said plurality of servers include an LDAP authentication server.

6. The system of claim 1, further comprising a user information cache that caches a copy of said user authentication information in case of a failure in a communication link between the first application server and the second application server.

7. The system of claim 1 wherein the system is scalable to include multiple LDAP authentication servers and/or multiple embedded LDAP servers.

8. A method for providing single security administration comprising the steps of:

providing a first application server of a transactional server type, which is configured to execute transaction processes including receiving transactional procedure calls from clients to initiate the transaction processes, wherein the first server includes an access control list which defines user security information for use in authorizing the calls from clients, and a Lightweight Directory Access Protocol (LDAP) authentication server plugin which is configured to forward the transactional procedure calls from clients to another application server for authorization;

providing a second application server of a non-transactional server type, which is configured to administer security for the first application server, wherein the second application server includes a user profile database which includes security information for a plurality of users, including for each of the users a mapping of security credentials for that user between the transactional server type and the non-transactional server type, and an embedded LDAP server which is configured to receive and process the transactional procedure calls from the LDAP authentication server plugin;

receiving a transactional procedure call to initiate a transaction from a client at the first application server;

performing, via the LDAP authentication server plugin, the steps of identifying the user associated with the transactional procedure call, determining that the second application server should authenticate the user, initiating a LDAP session between the first application server and the second application server, determining a third application server of a non-transactional server type that stores user and group information for the user, when the second application server fails, initiating an LDAP session between the first application server and the third application server, and forwarding the transactional procedure call to an embedded LDAP server in the third application server;

receiving the transactional procedure call from the LDAP authentication server plugin at the embedded LDAP server;

performing, via the embedded LDAP server, the steps of processing the transactional procedure call, determining a corresponding user information from the user profile database, and returning the corresponding user information to the LDAP authentication server plugin;

receiving from the embedded LDAP server a corresponding user information as determined by the user profile database at the second application server; and creating, via the LDAP authentication server plugin, a token reflecting an authentication result based on the corresponding user security information, which is subsequently used to authenticate the client to participate in the transaction.

9. The method of claim 8, further comprising the step, prior to issuing a call, of allowing a client to access a default security plugin.

10. The method of claim 8 wherein said first application server is an enterprise server.

11. The method of claim 8 further comprising:

including in said transactional procedure call a query user information that is query user information that specifies a particular user or group of users.

12. The method of claim 8, further comprising: including a plurality of servers.

13. The method of claim 12, wherein at least two of said plurality of servers include a LDAP authentication server.

14. The method of claim 8, further comprising:

providing a user information cache that caches a copy of said user information.

15. The method of claim 8, further comprising:

being scalable to include multiple LDAP authentication servers and/or multiple embedded LDAP servers.

16. The system of claim 1, wherein:

the LDAP session supports a single user security data store and administration.

17. The system of claim 1, wherein:

the second application server supports backup or failover authentication.

18. The system of claim 17, further comprising:

a migrating utility that takes user security information from the separate security repository associated with the first application server and updates the security data repository associated with at least one of the second application servers.

19. The system of claim 1, wherein:

the LDAP authentication server plugin at the first application server further determines another second type server in a plurality of second type servers that stores user and group information for a particular user, when a previously determined second type server fails, initiates a session between the first application server and said another second type server, passes query information from said authentication server to an embedded LDAP server in said another second type server, and receives corresponding user and group information from the embedded LDAP server in said another second type server.

20. A non-transitory machine readable storage medium having instructions embedded thereon and performing the following functions when executed by a processor:

providing a first application server of a transactional server type, which is configured to execute transaction processes including receiving transactional procedure calls from clients to initiate the transaction processes, wherein the first server includes an access control list which defines user security information for use in authorizing the calls from clients, and a Lightweight Directory Access Protocol (LDAP) authentication server plugin which is configured to forward the transactional procedure calls from clients to another application server for authorization;

providing a second application server of a non-transactional server type, which is configured to administer security for the first application server, wherein the second application server includes a user profile database which includes security information for a plurality of users, including for each of the users a mapping of security credentials for that user between the transactional server type and the non-transactional server type, and an embedded LDAP server which is configured to receive and process the transactional procedure calls from the LDAP authentication server plugin;

receiving a transactional procedure call to initiate a transaction from a client at the first application server; and performing, via the LDAP authentication server plugin, the steps of identifying the user associated with the call, determining that the second application server should authenticate the user, initiating a LDAP session between the first application server and the second application server, determining a third application server of a non-transactional server type that stores user and group information for the user, when the second application server fails, initiating an LDAP session between the first application server and the third application server, and forward the transactional procedure call to the embedded LDAP server;

receiving the transactional procedure call from the LDAP authentication server plugin at the embedded LDAP server;

performing, via the embedded LDAP server, the steps of processing the transactional procedure call, determining a corresponding user information from the user profile database, and returning the corresponding user information to the LDAP authentication server plugin;

receiving from the embedded LDAP server a corresponding user information as determined by the user profile database at the second application server; and creating, via the LDAP authentication server plugin, a token reflecting an authentication result based on the corresponding user security information, which is subsequently used to authenticate the client to participate in the transaction.

21. The system of claim 1 wherein the second server include a console program for administering the security of the first server.

22. The system of claim 1 wherein the first application server also supports a separate authentication mechanism with a separate security repository and independent of the LDAP authentication server plugin.

23. The system of claim 1 wherein an administrator of the first server is mapped to an administrator for the second server by default.

* * * * *

UNITED STATES PATENT AND TRADEMARK OFFICE
CERTIFICATE OF CORRECTION

| | | |
|---|---|---|
| PATENT NO. | : 7,831,999 B2 | Page 1 of 1 |
| APPLICATION NO. | : 10/731371 | |
| DATED | : November 9, 2010 | |
| INVENTOR(S) | : Hong-Hsi Lo et al. | |

It is certified that error appears in the above-identified patent and that said Letters Patent is hereby corrected as shown below:

In column 5, line 37, delete "wIsMemberOf" and insert -- wlsMemberOf --, therefor.

In column 6, line 34, delete "oroptical" and insert -- or optical --, therefor.

In column 9, line 7, in claim 13, delete "12," and insert -- 12 --, therefor.

Signed and Sealed this
Second Day of August, 2011

David J. Kappos
*Director of the United States Patent and Trademark Office*